United States Patent
Duggan et al.

(10) Patent No.: US 7,987,690 B2
(45) Date of Patent: Aug. 2, 2011

(54) FLUID CONDUITS WITH INTEGRAL END FITTINGS AND ASSOCIATED METHODS OF MANUFACTURE AND USE

(75) Inventors: Michael Duggan, St. Louis, MO (US); Forrest Nixon, Columbia, IL (US); Steven L. Blair, Sr., Maryville, IL (US)

(73) Assignee: Cerro Flow Products LLC, Sauget, IL (US)

( * ) Notice: Subject to any disclaimer, the term of this patent is extended or adjusted under 35 U.S.C. 154(b) by 140 days.

(21) Appl. No.: 12/137,442

(22) Filed: Jun. 11, 2008

(65) Prior Publication Data

US 2009/0173130 A1 Jul. 9, 2009

Related U.S. Application Data

(63) Continuation-in-part of application No. 11/969,844, filed on Jan. 4, 2008.

(51) Int. Cl.
*B21D 41/02* (2006.01)
(52) U.S. Cl. ............... 72/370.03; 72/370.06; 72/370.21
(58) Field of Classification Search ............. 72/370.01, 72/370.03, 370.06, 370.1, 370.14, 370.15, 72/370.21, 370.23, 364; 285/334.3
See application file for complete search history.

(56) References Cited

U.S. PATENT DOCUMENTS

| | | | |
|---|---|---|---|
| 1,337,547 A | 4/1920 | Dohner | |
| 1,791,887 A | 2/1931 | Davies et al. | |
| 1,801,171 A | 4/1931 | Mueller et al. | |
| 1,817,854 A | 8/1931 | Sorensen | |
| 1,920,512 A | 8/1933 | Lamont | |
| 2,065,595 A * | 12/1936 | Lynch | 285/333 |
| 2,120,067 A | 6/1938 | Grey et al. | |
| 2,152,962 A | 4/1939 | Ice | |
| 2,183,476 A | 12/1939 | Feiler | |
| 2,268,246 A * | 12/1941 | Dooley | 72/370.03 |
| 2,326,929 A | 8/1943 | Cowles | |

(Continued)

FOREIGN PATENT DOCUMENTS

DE 801888 1/1951

(Continued)

OTHER PUBLICATIONS

Wang, Z., "Numerical and experimental research of the cold upsetting-extruding of tube flanges," Journal of Materials Processing Technology, vol. 110, Issue 1, Mar. 1, 2001, pp. 28-35, http://www.sciencedirect.com, 6 pgs. [accessed by Internet on Apr. 10, 2008].

(Continued)

*Primary Examiner* — Edward Tolan
(74) *Attorney, Agent, or Firm* — Perkins Coie LLP (57) ABSTRACT

Fluid conduits for plumbing and other uses having integral end fittings are disclosed herein. A method of forming a fluid conduit in accordance with an embodiment of the disclosure includes providing a copper tube having a first inner diameter and a first wall thickness, and heat treating an end portion of the copper tube to a predetermined hardness. The method can further include increasing the wall thickness of the end portion from the first wall thickness to a second wall thickness, and increasing the inner diameter of the end portion from the first inner diameter to a second inner diameter. The method further includes forming a circular groove in an interior surface of the end portion and positioning a seal in the circular groove.

20 Claims, 9 Drawing Sheets

U.S. PATENT DOCUMENTS

| | | |
|---|---|---|
| 2,427,026 A | 9/1947 | Smith |
| 2,476,656 A | 7/1949 | Galbraith |
| 2,494,128 A * | 1/1950 | Holmquist et al. ............. 72/340 |
| 2,497,273 A | 2/1950 | Richardson |
| 2,515,219 A | 7/1950 | Harding |
| 2,702,716 A | 2/1955 | Basolo et al. |
| 2,738,992 A | 3/1956 | Heisler |
| 2,741,498 A | 4/1956 | Elliott |
| 2,809,687 A | 10/1957 | Ogle |
| 2,821,415 A | 1/1958 | Race, Jr. |
| 2,831,711 A | 4/1958 | Leadbetter |
| 2,959,430 A | 11/1960 | Haslam |
| 3,122,830 A | 3/1964 | Dawson et al. |
| 3,210,102 A | 10/1965 | Joslin |
| 3,220,098 A | 11/1965 | Arbogast |
| 3,230,754 A | 1/1966 | Arbogast |
| 3,244,441 A | 4/1966 | Caudle |
| 3,263,476 A | 8/1966 | Hinderer |
| 3,335,590 A | 8/1967 | Early |
| 3,343,252 A | 9/1967 | Reesor |
| 3,451,113 A | 6/1969 | Holden |
| 3,477,506 A | 11/1969 | Malone |
| 3,539,205 A | 11/1970 | Johnson et al. |
| 3,553,780 A | 1/1971 | Kuhlemann |
| 3,557,278 A | 1/1971 | Kuhlemann |
| 3,595,047 A | 7/1971 | Fanning et al. |
| 3,596,939 A * | 8/1971 | Gibson ...................... 285/382.2 |
| 3,820,370 A | 6/1974 | Duffy |
| 3,866,457 A | 2/1975 | Bagby |
| 3,888,519 A | 6/1975 | Smith et al. |
| 3,966,385 A | 6/1976 | Spears |
| 4,018,462 A | 4/1977 | Saka et al. |
| 4,034,994 A | 7/1977 | Ohta et al. |
| 4,091,648 A | 5/1978 | McCaslin |
| 4,265,102 A | 5/1981 | Shimakata et al. |
| 4,310,185 A | 1/1982 | Bartholomew |
| 4,330,924 A | 5/1982 | Kushner et al. |
| 4,362,323 A | 12/1982 | Lodder et al. |
| 4,371,199 A | 2/1983 | Kushner et al. |
| 4,406,852 A | 9/1983 | Riegel et al. |
| 4,420,866 A | 12/1983 | Mueller |
| 4,513,598 A | 4/1985 | Costabile |
| 4,523,780 A | 6/1985 | Cheer et al. |
| 4,528,740 A | 7/1985 | Sassak |
| 4,541,655 A | 9/1985 | Hunter |
| 4,557,128 A | 12/1985 | Costabile |
| 4,576,403 A | 3/1986 | Burkholder |
| 4,590,655 A | 5/1986 | Javorik |
| 4,649,728 A | 3/1987 | LaCount et al. |
| 4,690,434 A | 9/1987 | Schmidt |
| 4,748,836 A | 6/1988 | Hoeboer et al. |
| 4,819,974 A | 4/1989 | Zeidler et al. |
| 4,834,430 A | 5/1989 | Vassallo et al. |
| 4,845,972 A | 7/1989 | Takeuchi et al. |
| 4,850,096 A | 7/1989 | Gotoh et al. |
| 4,850,621 A | 7/1989 | Umehara et al. |
| 4,880,260 A | 11/1989 | Gotoh et al. |
| 4,902,049 A | 2/1990 | Umehara et al. |
| 4,980,961 A | 1/1991 | Caudill |
| 5,007,667 A | 4/1991 | Unewisse et al. |
| 5,090,743 A | 2/1992 | Obering |
| 5,108,134 A | 4/1992 | Irwin et al. |
| 5,168,618 A | 12/1992 | Unewisse et al. |
| 5,184,495 A | 2/1993 | Chunn et al. |
| 5,341,566 A | 8/1994 | Quitschau et al. |
| 5,419,171 A | 5/1995 | Bumgarner |
| 5,484,174 A | 1/1996 | Gotoh et al. |
| 5,487,294 A | 1/1996 | Petersen et al. |
| 5,517,843 A | 5/1996 | Winship |
| 5,544,406 A | 8/1996 | Ridenour et al. |
| 5,584,512 A | 12/1996 | Carstensen |
| 5,615,481 A | 4/1997 | Viegener et al. |
| 5,695,224 A | 12/1997 | Grenier |
| 5,743,301 A | 4/1998 | Winship |
| 5,749,138 A | 5/1998 | Usui et al. |
| 5,779,283 A | 7/1998 | Kimura et al. |
| 5,823,031 A | 10/1998 | Campbell et al. |
| 5,921,591 A | 7/1999 | Argent |
| 5,927,763 A | 7/1999 | Mehr et al. |
| 6,049,962 A | 4/2000 | Pfeiffer et al. |
| 6,058,755 A | 5/2000 | Viegener et al. |
| 6,059,338 A | 5/2000 | Diederichs et al. |
| 6,082,784 A | 7/2000 | Fukaya |
| 6,099,045 A | 8/2000 | Pirona et al. |
| 6,202,284 B1 | 3/2001 | Joblin |
| 6,224,114 B1 | 5/2001 | Franzen et al. |
| 6,241,290 B1 | 6/2001 | Foering et al. |
| 6,260,891 B1 | 7/2001 | Foering et al. |
| 6,299,071 B1 | 10/2001 | Fiedrich |
| 6,425,608 B1 | 7/2002 | Nordstrom |
| 6,427,309 B1 | 8/2002 | Viegener et al. |
| 6,427,501 B2 | 8/2002 | Ramsauer et al. |
| 6,450,550 B1 | 9/2002 | Cornwell |
| 6,474,699 B1 | 11/2002 | Neuhaus et al. |
| 6,477,757 B2 | 11/2002 | Viegener et al. |
| 6,494,501 B2 | 12/2002 | Gotoh et al. |
| 6,517,126 B1 | 2/2003 | Peterson et al. |
| 6,581,983 B1 | 6/2003 | Viegener et al. |
| 6,634,677 B2 | 10/2003 | Mehr et al. |
| 6,654,995 B1 | 12/2003 | Wang et al. |
| 6,726,256 B2 | 4/2004 | Viegener et al. |
| 6,805,385 B2 | 10/2004 | Viegener et al. |
| 6,808,210 B1 | 10/2004 | Harrison et al. |
| 6,843,096 B2 | 1/2005 | Viegener et al. |
| 6,843,516 B2 | 1/2005 | Bishop et al. |
| 6,848,725 B2 | 2/2005 | Logan et al. |
| 6,874,823 B2 | 4/2005 | Viegener et al. |
| 7,125,053 B2 * | 10/2006 | Hashem ....................... 285/333 |
| 7,201,382 B2 | 4/2007 | Viegener et al. |
| 7,237,427 B2 | 7/2007 | Viegener et al. |
| 7,316,429 B2 | 1/2008 | Viegener et al. |
| 7,360,591 B2 | 4/2008 | Ring |
| 7,699,360 B2 | 4/2010 | Haney et al. |
| 7,722,093 B2 | 5/2010 | Henke |
| 7,770,429 B2 * | 8/2010 | Viegner et al. ............. 72/370.06 |
| 2004/0227346 A1 | 11/2004 | Jamison et al. |
| 2007/0090641 A1 | 4/2007 | Jamison et al. |
| 2007/0205001 A1 * | 9/2007 | Shuster et al. ................ 166/380 |

FOREIGN PATENT DOCUMENTS

| | | |
|---|---|---|
| DE | 3124957 | 1/1983 |
| FR | 1496155 | 9/1967 |
| GB | 415013 | 8/1934 |
| GB | 570093 | 6/1945 |
| WO | WO-93/10924 | 6/1993 |
| WO | WO-95/25241 | 9/1995 |

OTHER PUBLICATIONS

"Ditch Witch Drill Pipe Offers Unique Advantages," Associated Construction Publications, Dec. 1, 2007, http://www.acppubs.com/index, 2 pgs. [accessed by Internet on Apr. 10, 2008].

Lyons, et al., Standard Handbook of Petroleum Natural Gas Engineering, Oct. 2004, Second Edition, Publisher: Elsevier Science & Technology Books, pp. 4-87, 4-90, and 4-137.

International Search Report and Written Opinion dated Sep. 25, 2008 for International Application No. PCT/US2008/067115.

Non-Final Office Action; U.S. Appl. No. 11/969,844, Mailing Date Jun. 21, 2010, 17 pages.

Notice of Allowance; U.S. Appl. No. 11/969,844, Mailing Date Mar. 2, 2011, 11 pages.

* cited by examiner

FLUID CONDUITS WITH INTEGRAL END FITTINGS AND ASSOCIATED METHODS OF MANUFACTURE AND USE

CROSS-REFERENCE TO RELATED APPLICATIONS INCORPORATED BY REFERENCE

The present application is a continuation-in-part of U.S. patent application Ser. No. 11/969,844, entitled "Fluid Conduits With Integral End Fittings And Associated Methods Of Manufacture And Use," filed on Jan. 4, 2008, which is incorporated herein in its entirety by reference.

TECHNICAL FIELD

The following disclosure relates generally to end fittings for copper tubing and other types of fluid conduits.

BACKGROUND

Conduits are used in many different applications to supply and distribute various liquids and gases. Potable water, for example, typically flows through copper tubing installed throughout residential and commercial buildings. When installing copper tubing for such applications, it is typically necessary to join a number of individual tubes together. One common method of joining copper tubes involves installing a separate end fitting between adjacent tubes. The end fitting receives an end portion of a first tube and an end portion of a second tube to form a sealed connection therebetween.

One well-known method of joining end fittings to copper tubes includes soldering the respective tube ends to opposing ends of the fitting. Soldering the tubes to the fitting, however, can be a time consuming process. Moreover, modern plumbing codes have restricted the types of solder and flux that can be used for making these soldered connections. For example, lead free solder and water soluble flux is typically encouraged, rather than lead based solder and acid based flux. However, lead free solder and water soluble flux may not be as effective in connecting the fitting to the tubes as lead based solder and acid based flux.

Another method of joining a first conduit to a second conduit involves using a press fitting between the two conduits. A typical press fitting receives an end portion of each conduit and is crimped around the end portions to mechanically engage them and form a sealed connection therebetween. A press fitting can also include an adhesive, such as an epoxy or glue, to facilitate the connection. Similar to the soldered end fitting method described above, however, the press fitting has its drawbacks. For example, the press fitting is a separate component that must be crimped to each of the adjacent conduits. Accordingly, joining a number of tubes together can be a time consuming process.

Conduits in the drilling industry have also been joined together to form extended drill pipes. Metal drill pipes, such as steel drill pipes, for example, are frequently assembled by joining multiple lengths of pipe together. To join the pipes, the end portions are upset and threaded. Upsetting the end portions increases the wall thickness and diameter to facilitate threading and provide a stronger connection between the pipes. In some instances, the thickened end portions can also be welded to enhance the connection between the pipes.

SUMMARY

The following summary is provided for the benefit of the reader only, and is not intended to limit the disclosure as set forth by the claims in any way.

The present disclosure is directed generally to fluid conduits having integral end fittings. A fluid conduit configured in accordance with one aspect of the disclosure includes a copper tube having an end portion formed into a fitting. The copper tube includes a body portion adjacent to the end portion. The body portion has a first wall thickness and the end portion has a second wall thickness that is equal to or greater than the first wall thickness. The end portion also has an inner diameter that is greater than an outer diameter of the body portion. In other embodiments, the inner diameter of the end portion can be equal to or greater than the outer diameter of the body portion. The copper tube can further include a resilient seal disposed in an annular groove formed in an interior surface of the end portion. During assembly of the copper tube to another copper tube, an end portion of the second copper tube can be inserted into the end portion of the first tube, and the end portion of the first tube can be compressed around the other tube to form a fluid tight connection therebetween.

A fluid conduit configured in accordance with another aspect of the disclosure includes a tube having an end portion formed into a fitting. The end portion has an inner diameter that is greater than an outer diameter of a body portion of the tube. In other embodiments, the inner diameter of the end portion can be equal to or greater than the outer diameter of the body portion. The fluid conduit can further include a sleeve that is coaxially disposed over the end portion of the tube. The end portion of the tube and the sleeve have a combined first wall thickness that is greater than a second wall thickness of the body portion of the tube. The fluid conduit can also include a seal positioned in an annular groove formed in an interior surface of the end portion of the tube. During assembly of the first tube to a second tube, the end portion of the second tube can be inserted into the end portion of the first tube, and the end portion of the first tube and the sleeve can be compressed around the second tube to form a fluid tight connection therebetween.

A method of mechanically joining a first copper tube to a second copper tube according to another embodiment of the disclosure includes inserting a first end portion of the first copper tube into a second end portion of the second copper tube. The first end portion has a first wall thickness, and the second end portion has a second wall thickness that is greater that the first wall thickness. The method can further include compressing the second end portion around the first end portion to join the first copper tube to the second copper tube.

Another embodiment of the disclosure is directed to a method of forming an end portion of a copper tube into a fitting. The method includes increasing an inner diameter of the end portion from a first inner diameter to a second inner diameter. The method also includes increasing a wall thickness of the end portion from a first wall thickness to a second wall thickness. An upset forging process can be used to increase the first inner diameter and the first wall thickness of the end portion. The method can also include disposing a seal in a circular groove formed in an interior surface of the end portion.

A method of forming a fluid conduit in accordance with another embodiment of the disclosure includes providing a copper tube having a first inner diameter and a first wall thickness. The method can further include heat treating an end portion of the copper tube to a predetermined hardness. In one embodiment, heat treating the end portion of the copper tube can include annealing the end portion of the copper tube to reduce the hardness. The method can also include increasing the wall thickness of the end portion from the first wall thickness to a second wall thickness, and increasing the inner diameter of the end portion from the first inner diameter to a second inner diameter. The method can further include forming a circular groove in an interior surface of the end portion.

DETAILED DESCRIPTION

The following disclosure describes copper tubes and other types of fluid conduits having integral end fittings, and methods of making and using such fluid conduits. Certain details are set forth in the following description and in FIGS. 1-7B to provide a thorough understanding of various embodiments of the disclosure. Other details describing well-known structures and components often associated with copper tubing and other fluid conduits, however, are not set forth below to avoid unnecessarily obscuring the description of the various embodiments of the disclosure.

Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Various embodiments of the disclosure can include structures other than those illustrated in the Figures and are expressly not limited to the structures shown in the Figures.

Figure 1A:
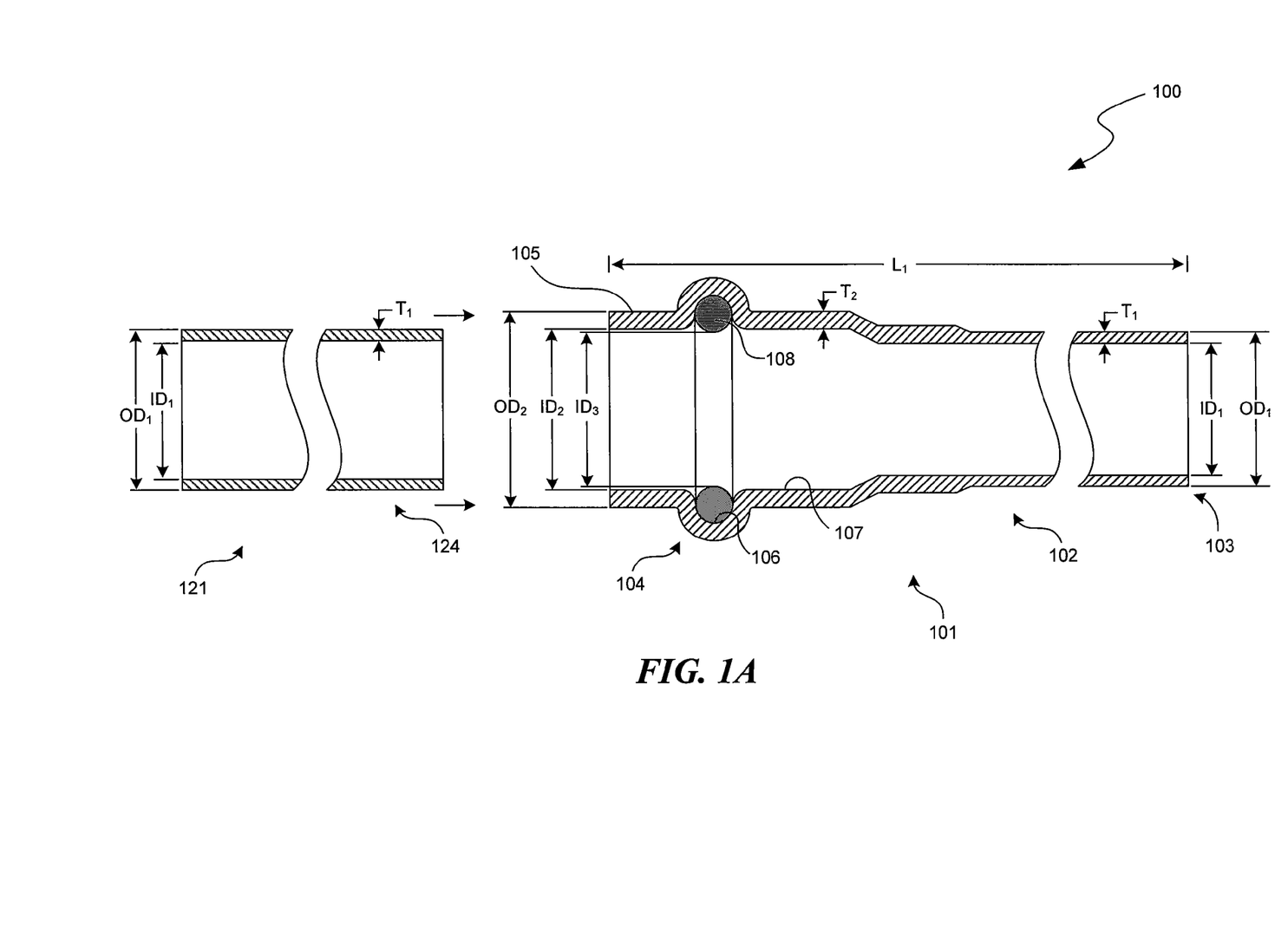
FIGS. 1A and 1B are cross-sectional side views of a fluid conduit assembly configured in accordance with an embodiment of the disclosure.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1. Moreover, the various elements and features illustrated in the Figures may not be drawn to scale.

Figure 1B:
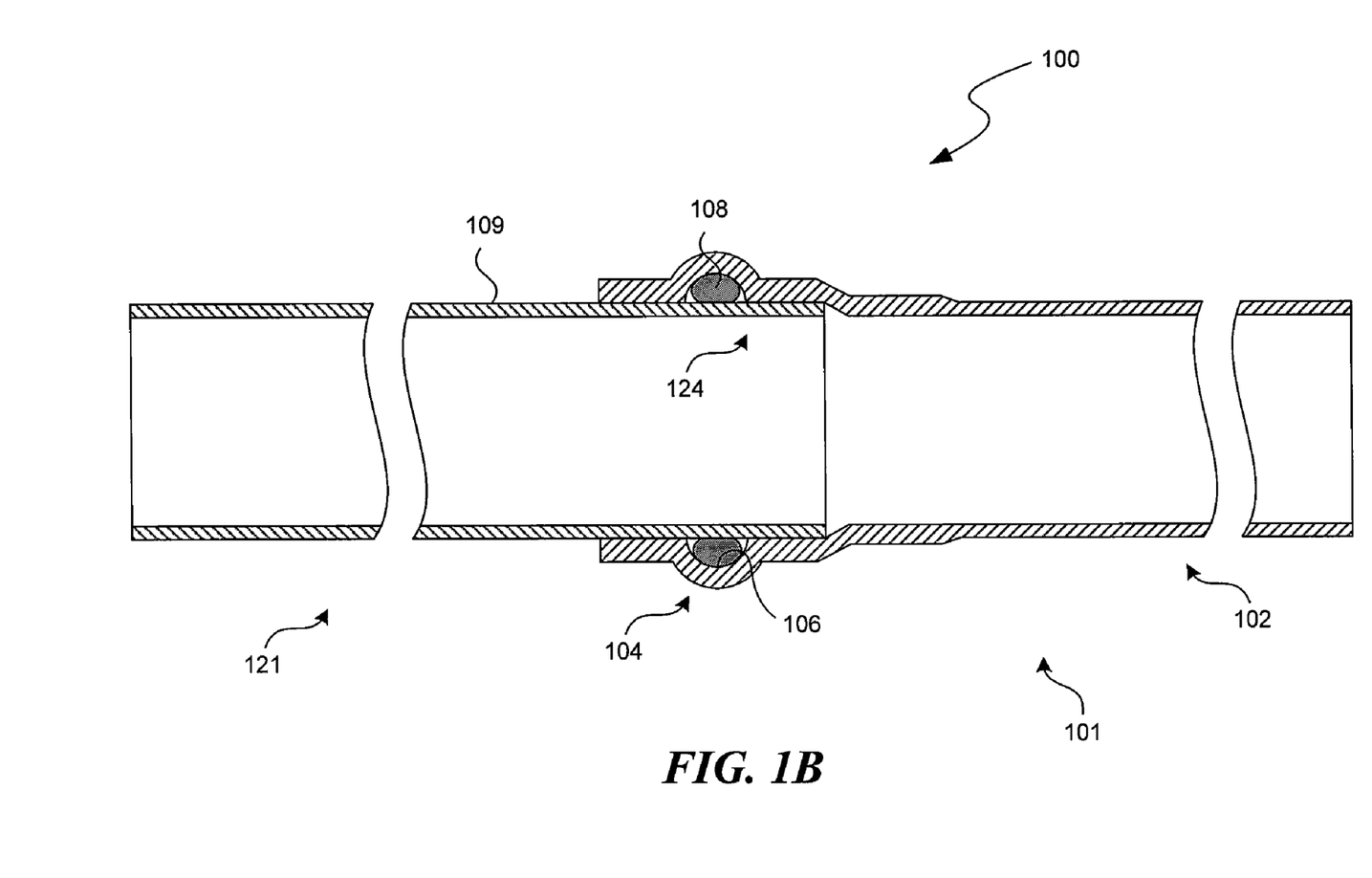

FIGS. 1A and 1B are a cross-sectional side views of a fluid conduit assembly 100 configured in accordance with an embodiment of the disclosure. Some of the features illustrated in FIG. 1A and beyond may not be drawn to scale for purposes of clarity. Referring first to FIG. 1A, the fluid conduit assembly 100 includes a first fluid conduit 101 that is configured to be joined (e.g., mechanically joined) to a second fluid conduit 121. The first conduit 101 has a first end portion 104 integrally formed into a flare type press-fitting 105. The first conduit 101 also includes a body portion 102 adjacent to the first end portion 104. The body portion 102 has a first wall thickness $T_1$, a first inner diameter $ID_1$, and a first outer diameter $OD_1$. In the illustrated embodiment, the first end portion 104 has a second wall thickness $T_2$ that is equal to or greater than the first wall thickness $T_1$. The first end portion 104 also has a flared portion with a second inner diameter $ID_2$ and a second outer diameter $OD_2$. The second inner diameter $ID_2$ is greater than the first outer diameter $OD_1$ of the body portion 102. In other embodiments, however, the second inner diameter $ID_2$ can be equal to or greater than the first outer diameter $OD_1$.

The first end portion 104 also includes an annular channel or groove 106 formed in an interior surface 107. A seal, such as a circular o-ring type seal 108, is positioned in the groove 106. The seal 108 has a third inner diameter $ID_3$ that is less than the first outer diameter $OD_1$ of the body portion 102. The seal 108 can be formed from a resilient and/or deformable material and can include an o-ring, gasket or other type of suitable seal for use with liquid and/or gas conduits. In one embodiment, for example, the o-ring can be formed from an elastomeric and/or rubber material, silicone, Teflon, etc. In the illustrated embodiment, the seal 108 is an o-ring type seal with a generally circular cross-section. The seal 108 has a single piece construction that extends completely around the annular groove 106. In other embodiments, however, the seal 108 can include multiple segments, can have other cross-sectional shapes, including, for example, square, rectangular, oval and/or other shapes, and/or can be formed from different materials including tapes, adhesives, etc. Accordingly, the present disclosure is not limited to the particular type of seal illustrated in FIG. 1A.

The first conduit 101 can be of virtually any commercially available or commercially desirable length $L_1$. For example, in one embodiment, the first conduit 101 can have a total length $L_1$ of about 20 feet, which is a typical standard length of copper tube. The first conduit 101 includes a second end portion 103 opposite the first end portion 104. In the illustrated embodiment, the second end portion 103 is straight and generally similar to the body portion 102. However, in another embodiment, the second end portion 103 can be at least generally similar to the first end portion 104. Moreover, although the illustrated body portion 102 is generally straight in FIG. 1A, in other embodiments the body portion 102 can include bent or curved portions to accommodate particular applications.

The first end portion 104 is configured to receive a second end portion 124 of the second conduit 121. The second conduit 121 can be of virtually any length, including, for example, the same length as the first conduit 101. Indeed, in one embodiment the second conduit 121 can be the same as the first conduit 101. In another embodiment, the second conduit 121 can have a generally uniform inner diameter, outer diameter, and wall thickness. For example, in the embodiment illustrated in FIG. 1A, the second conduit 121 includes an outer diameter and an inner diameter that can be approximately equal to the outer diameter $OD_1$ and the inner diameter $ID_1$ of the body portion 102 of the first conduit 101. The illustrated second conduit 121 can also include a wall thickness that is approximately equal to the wall thickness $T_1$ of the body portion 102.

FIG. 1B is a cross-sectional side view of the fluid conduit assembly 100 with the second end portion 124 inserted into the first end portion 104. When the second end portion 124 is inserted into the first end portion 104, the seal 108 contacts an outer surface 109 of the second end portion 124. After insertion of the second end portion 124, the first end portion 104 can be crimped, compressed, or otherwise deformed to mechanically join the end portions of the first and second conduits 101, 121 and form a sealed connection therebetween. Compressing the first end portion 104 around the second end portion 124 places the first end portion 104 in circumferential tension and the second end portion 124 in circumferential compression to thereby clamp the two end portions together and form a mechanical bond therebetween. Suitable crimping tools (e.g., hydroelectric, electromechanical, etc. crimping tools) for compressing the first end portion 104 and putting the first end portion 104 in circumferential compression are known in the art. The increased second wall thickness $T_2$ of the first end portion 104 develops sufficient mechanical strength during the compression to meet required industry standards for different applications of the conduit. For example, conduits containing pressurized gas may be required to form a tighter seal than conduits containing water.

The conduits described herein can be used with various types of liquids, gases, and other fluids. For example, these conduits can be used with potable water in buildings and houses, oils, chemicals, air conditioning and refrigeration systems, sprinkler systems, compressed gas systems, fuel distribution systems, etc. In one embodiment, for example, the first conduit 101 can be formed from copper or copper alloy tubing having wall thicknesses in accordance with standards promulgated by the American Society of Mechanical Engineers ("ASME"). For example, copper tubing is generally available in at least three different standardized ASME types: thin-walled type M tubing, medium-walled type L tubing and thick-walled type K tubing. Each type of copper tubing (e.g., L, M and K) has a standardized wall thickness for a corresponding nominal diameter. As used herein, a nominal diameter is a designation used to specify a size of tubing, and it is not necessarily equal to the exact outer diameter of the tubing. For example, type L copper tube having a 2.0 inch nominal diameter typically has an actual outer diameter of about 2.125 inches and a wall thickness of about 0.070 inch. Similarly, thicker walled type K copper tube having a 2.0 inch nominal diameter typically has an actual outer diameter of about 2.125 inches but a wall thickness of about 0.083 inch. Table 1 lists several representative examples of ASME standardized dimensions for different types of copper tubing used with water. Although Table 1 lists several representative dimensions of copper tubing that can be used to form the first and second conduits 101, 121, Table 1 is not intended to be exhaustive. Accordingly, the embodiments disclosed herein can include dimensions that are greater than or less than the dimensions shown in Table 1, and are not limited to copper tubing having the dimensions shown in Table 1 below.

TABLE 1

| Wall thicknesses in inches of different types of copper tubing according to ASME standards | | | | |
|---|---|---|---|---|
| Nominal Diameter | Actual Diameter | Wall Thickness | | |
| | | Type M | Type L | Type K |
| ½ | 0.625 | 0.028 | 0.040 | 0.049 |
| ⅝ | 0.750 | — | 0.042 | 0.049 |
| ¾ | 0.875 | 0.032 | 0.045 | 0.065 |
| 1 | 1.125 | 0.035 | 0.050 | 0.065 |
| 1¼ | 1.375 | 0.042 | 0.055 | 0.065 |
| 1½ | 1.625 | 0.049 | 0.060 | 0.072 |
| 2 | 2.125 | 0.058 | 0.070 | 0.083 |
| 2½ | 2.625 | 0.065 | 0.080 | 0.095 |
| 3 | 3.125 | 0.072 | 0.090 | 0.109 |
| 3½ | 3.625 | 0.083 | 0.100 | 0.120 |
| 4 | 4.125 | 0.095 | 0.110 | 0.134 |
| 5 | 5.125 | 0.109 | 0.125 | 0.160 |
| 6 | 6.125 | 0.122 | 0.140 | 0.192 |

Conduits configured in accordance with embodiments of the disclosure can be formed from standardized copper tubing. For example, the first wall thickness $T_1$ of the body portion 102 can correspond to the wall thickness of a standard size copper tube having a certain nominal diameter. The second wall thickness $T_2$ of the first end portion 104, however, is greater than the standard wall thickness of the body portion 102. In one embodiment, for example, the first wall thickness $T_1$ can be equal to the wall thickness of a type L copper tube of a certain nominal diameter, and the second wall thickness $T_2$ can be equal to or less than the wall thickness of a type K copper tube of the same nominal diameter. In other embodiments, however, the second wall thickness $T_2$ can be greater than that of the type K copper tube of the same nominal diameter. In still further embodiments, the conduits described herein can be made from materials other than copper, including metallic, non-metallic, and/or other suitable materials, in other sizes.

The fluid conduit assembly 100 illustrated in FIGS. 1A and 1B provides several advantages over conventional fittings for joining separate conduits. The illustrated first conduit 101, for example, can be joined to the second conduit 121 without a separate fitting between the conduits. Rather, the first end portion 104 forms a fitting that is integral with the body portion 102 of the first conduit 101. This is unlike existing conduit fitting assemblies that require a separate end fitting between adjacent conduits. The first conduit 101 prevents a user from having to stock, carry and position separate end fittings for each joint between conduits. This can dramatically reduce the assembly time for applications utilizing an extensive amount of conduit, such as in a commercial building for example. For example, the embodiments disclosed herein reduce the number of steps required to join two separate conduits. A conventional end fitting must be soldered, crimped, or otherwise joined to each of the conduits inserted into the fitting. The illustrated first conduit 101, however, only requires compressing the first end portion 104 around the second end portion 124, thus reducing the assembly steps. Moreover, because the fittings disclosed herein are integral with the corresponding conduits, they are less likely to leak compared to conventional separate end fittings because the disclosed integral fittings require less connections.

The embodiments of the present disclosure can also reduce the loss or theft associated with conventional separate end fittings. For example, as the price of copper increases, the value of copper fittings correspondingly increases. Because conventional end fittings are relatively small, they can be easily concealed, stolen, and/or otherwise misplaced. However, conduits of the present disclosure with integral end fittings would likely be more difficult to steal or misplace. For example, concealing and/or stealing a twenty foot copper tube with an integral end fitting would likely be more difficult than stealing an easily concealable separate end fitting.

FIGS. 2A-2D are cross-sectional side views illustrating various stages of forming a fluid conduit 201 in accordance with an embodiment of the disclosure. The conduit 201 illustrated in FIGS. 2A-2D includes several features that are at least generally similar in structure and function to those of the first conduit 101 discussed above with reference to FIGS. 1A and 1B. At the stage illustrated in FIG. 2A, the conduit 201 has a total length $L_1$ with a generally uniform first wall thickness $T_1$, and a generally uniform first inner diameter $ID_1$ and first outer diameter $OD_1$. In one embodiment, for example, the total length $L_1$ can be about 20 feet, the first wall thickness $T_1$ can be about 0.05 inch, the inner diameter $ID_1$ can be about 1.51 inches, and the outer diameter $OD_1$ can be about 1.62 inches. In other embodiments, these dimensions can differ, and can include, for example, the standardized dimensions described above with reference to Table 1. The conduit 201 includes a body portion 202 adjacent to an end portion 204. At stage illustrated in FIG. 2A, however, the end portion 204 has the same first wall thickness $T_1$, first inner diameter $ID_1$, and first outer diameter $OD_1$ as the body portion 202.

Figure 2A:
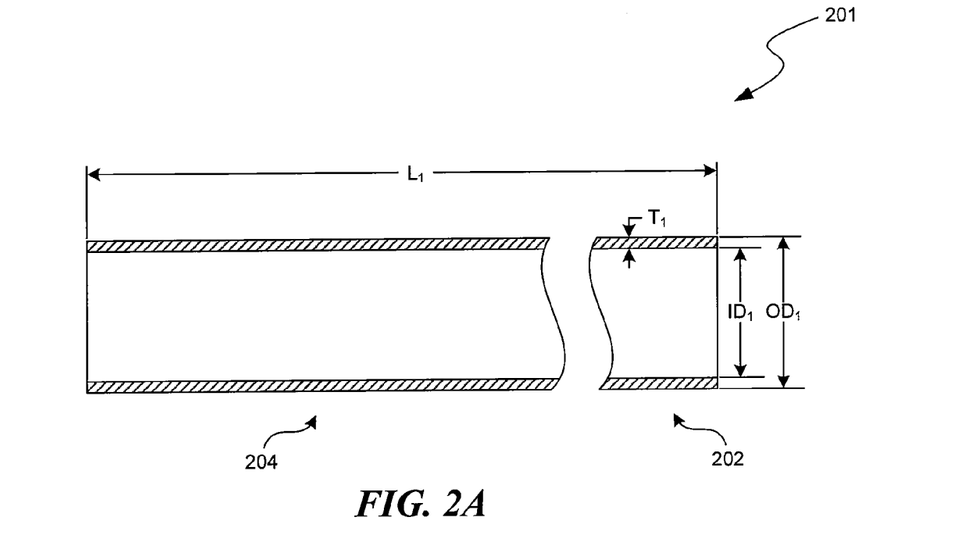
FIGS. 2A-2D are cross-sectional side views illustrating steps of forming a fluid conduit in accordance with an embodiment of the disclosure.
Figure 2B:
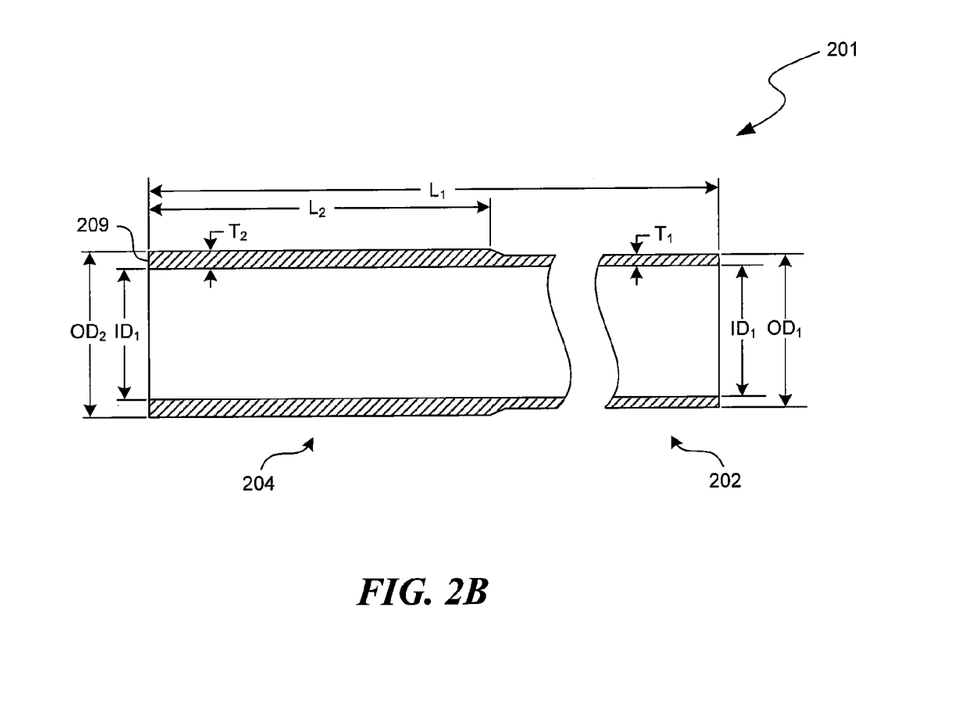

Referring next to FIG. 2B, the wall thickness of the end portion 204 is increased to a second wall thickness $T_2$ (e.g., about 0.07 inch in one embodiment) that is greater than the first wall thickness $T_1$ of the body portion 202. The second wall thickness $T_2$ extends for a second length $L_2$ from an end 209 of the conduit 201. In one embodiment, for example, the second length $L_2$ can about 2.0 inches. In other embodiments, however, the second length $L_2$ can be any other length that is suitable for forming a press fitting when a corresponding conduit is inserted into the end portion 204. At this stage, the end portion 204 still has the same first inner diameter $ID_1$ as the body portion 202, however, the outer diameter of the end portion 204 is increased to a second outer diameter $OD_2$ by virtue of the second wall thickness $T_2$.

In certain embodiments, the second wall thickness $T_2$ can be increased through an upset forging process. The upset forging process can utilize cool forging or hot forging techniques, and a series of dies can be used to control the thickness and corresponding inner and outer diameters of the end portion 204. In one embodiment, for example, the end portion 204 can be heated and supported in a first die, and then a second die can be driven into the end portion 204 to increase the wall thickness and/or enlarge the diameter of the end portion 204. Although the end portion 204 illustrated in FIG. 2B includes an externally upset second wall thickness $T_2$, in other embodiments the end portion 204 can be internally upset or both externally and internally upset to increase the second wall thickness $T_2$. As described in more detail below, in further embodiments other manufacturing processes, methods and/or components can be used to increase the wall thickness of the end portion 204.

Figure 2C:
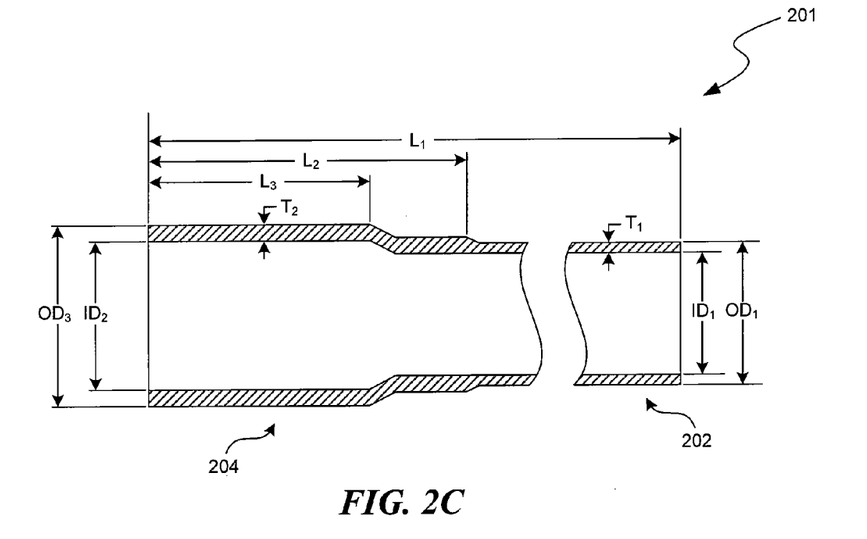

As illustrated in FIG. 2C, a segment of the end portion 204 is flared or enlarged to allow the end portion 204 to receive a separate conduit having the same, or at least approximately the same, first outer diameter $OD_1$ of the body portion 202. More specifically, a third length $L_3$ of the end portion 204 can be enlarged to have a second inner diameter $ID_2$ and a third outer diameter $OD_3$. In one embodiment, for example, the third length $L_3$ can be about 1.5 inches, the second inner diameter $ID_2$ can be about 1.65 inches, and the third outer diameter $OD_3$ can be about 1.79 inches. The second inner diameter $ID_2$ and the third outer diameter $OD_3$ can be formed during the upset forging process described above.

Figure 2D:
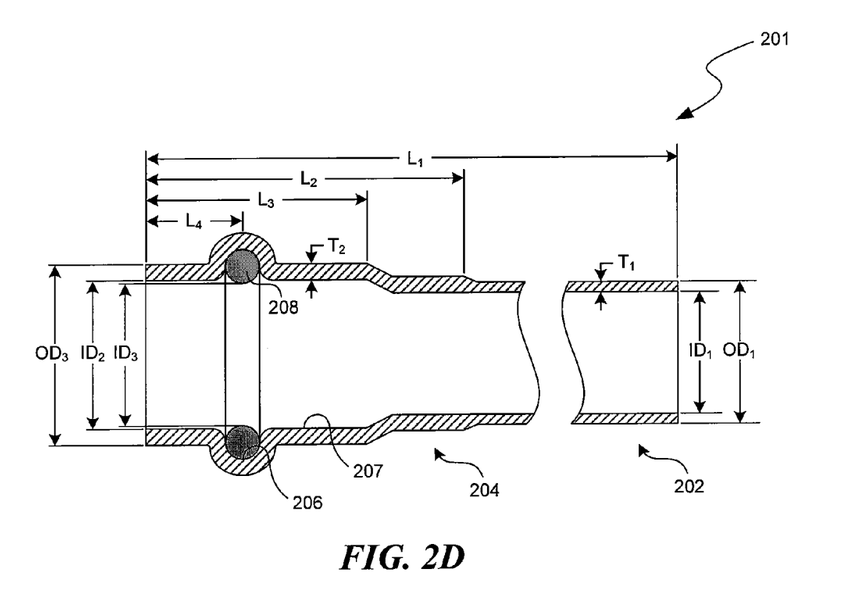

Turning next to FIG. 2D, an annular groove 206 is formed in an interior surface 207 of the end portion 204, and a seal 208 is disposed in the annular groove 206. The annular groove 206 is formed in the enlarged region of the end portion 204 (e.g., inset a fourth length $L_4$ from the end 209). In one embodiment, the fourth length $L_4$ can be about 0.5 inch, and the annular groove 206 can be formed on the interior surface 207 to receive the seal 208. The annular groove 206 can be formed by a rolling process or other suitable manufacturing process known in the art.

The seal 208 has a third inner diameter $ID_3$ that is smaller than the first inner diameter $ID_1$ of the body portion 202. For example, in one embodiment the third inner diameter can be about 1.60 inches, and the seal 208 can have a cross-sectional diameter of about 0.14 inch. When another conduit having the same first outer diameter $OD_1$ as the body portion 202 is inserted into the end portion 204, the seal 208 contacts the outer surface of the other conduit. In certain embodiments, the wall thickness of the annular groove 206 can be approximately the same as the second wall thickness $T_2$ of the end portion 204.

Figure 3A:
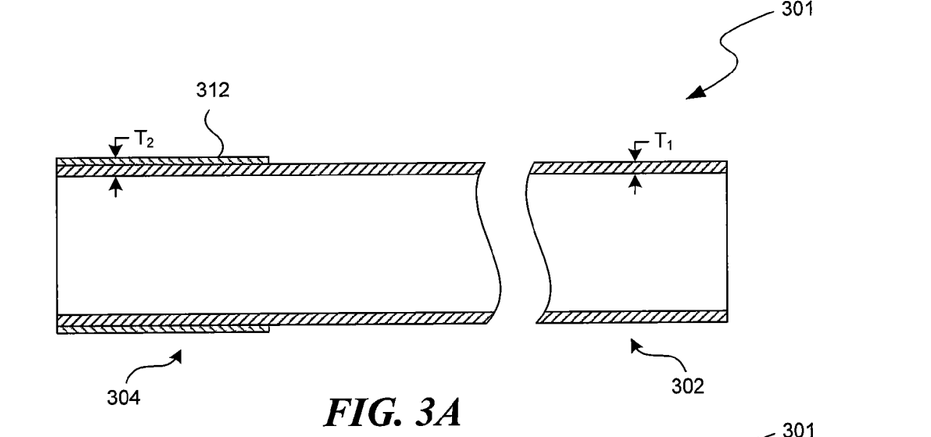
FIGS. 3A-3C are cross-sectional side views illustrating steps of forming a fluid conduit in accordance with another embodiment of the disclosure.
Figure 3B:
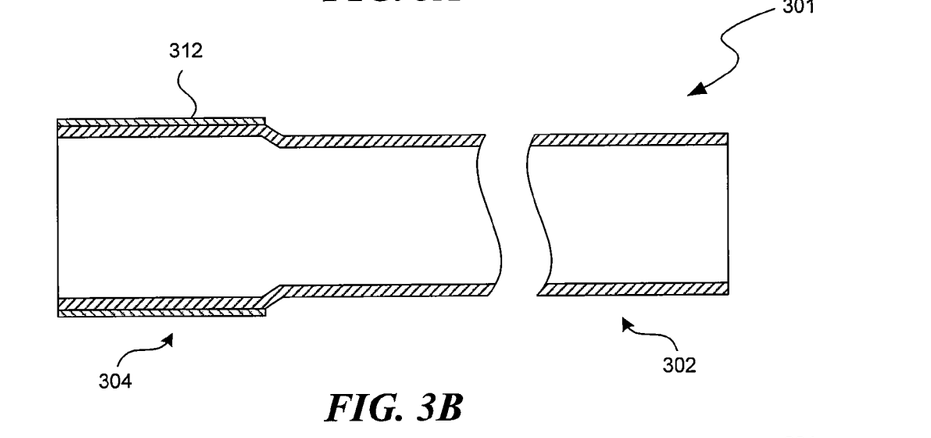
Figure 3C:
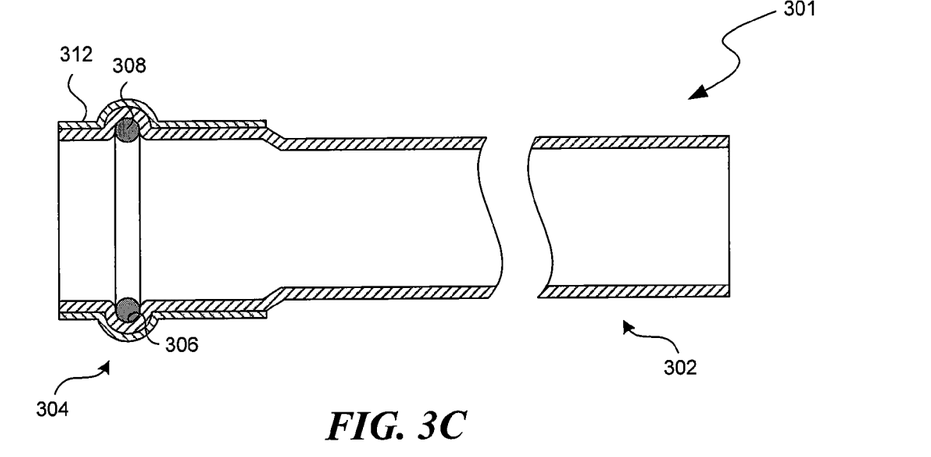

Although the wall thickness of the end portion can be increased with the upset forging techniques described above, FIGS. 3A-3C illustrate an alternative method of increasing the wall thickness of the end portion. More specifically, FIGS. 3A-3C are cross-sectional side views illustrating various stages of a method of forming a fluid conduit 301 having a sleeve 312 in accordance with an embodiment of the disclosure. Referring to FIG. 3A, the sleeve 312 is coaxially disposed over an end portion 304 of the conduit 301 to achieve an increased second wall thickness $T_2$. As a result, the second wall thickness $T_2$ includes the combination of the end portion 304 and the sleeve 312, which is equal to or greater than a first wall thickness $T_1$ of a body portion 302. In one embodiment, the sleeve 312 has approximately the same thickness as the end portion 304. In other embodiments, however, the sleeve can have a different thickness than the end portion 304. Moreover, the sleeve 312 can be made from the same material as the fluid conduit 301. For example, in one embodiment the fluid conduit 301 and the sleeve 312 can be a copper. In other embodiments, however, the sleeve 312 can be made from metallic, non-metallic, and/or other suitable materials. The sleeve 312 can be attached to the end portion 304 with an adhesive, by a press fit, or by welding, soldering, cool forming and/or by other suitable methods known in the art. For example, in certain embodiments the sleeve 312 is non-removably attached to the end portion 304. Although the sleeve 312 is positioned over the end portion 304 in the illustrated embodiment, in other embodiments the sleeve 312 can be positioned against an interior surface of the end portion 304.

In FIG. 3B, the inner diameter of the end portion 304 and attached sleeve 312 are enlarged as described above with reference to FIG. 2C (e.g., by an upset forging process) to allow the end portion 304 to receive a corresponding end portion of another conduit. In FIG. 3C, an annular groove 306 is formed on the interior surface of the end portion 304, and an adjacent portion of the sleeve 312. A seal 308 is positioned in the annular groove 306 to facilitate a fluid-tight seal in the end portion 304 when it is joined with another conduit. At that time, the end portion 304 and the sleeve 312 can be compressed or otherwise deformed to squeeze the inserted end portion of the other conduit. The sleeve 312 provides the end portion 304 with an increased wall thickness to strengthen the press fitting of the conduit 301 around the adjoining conduit.

Figure 4:
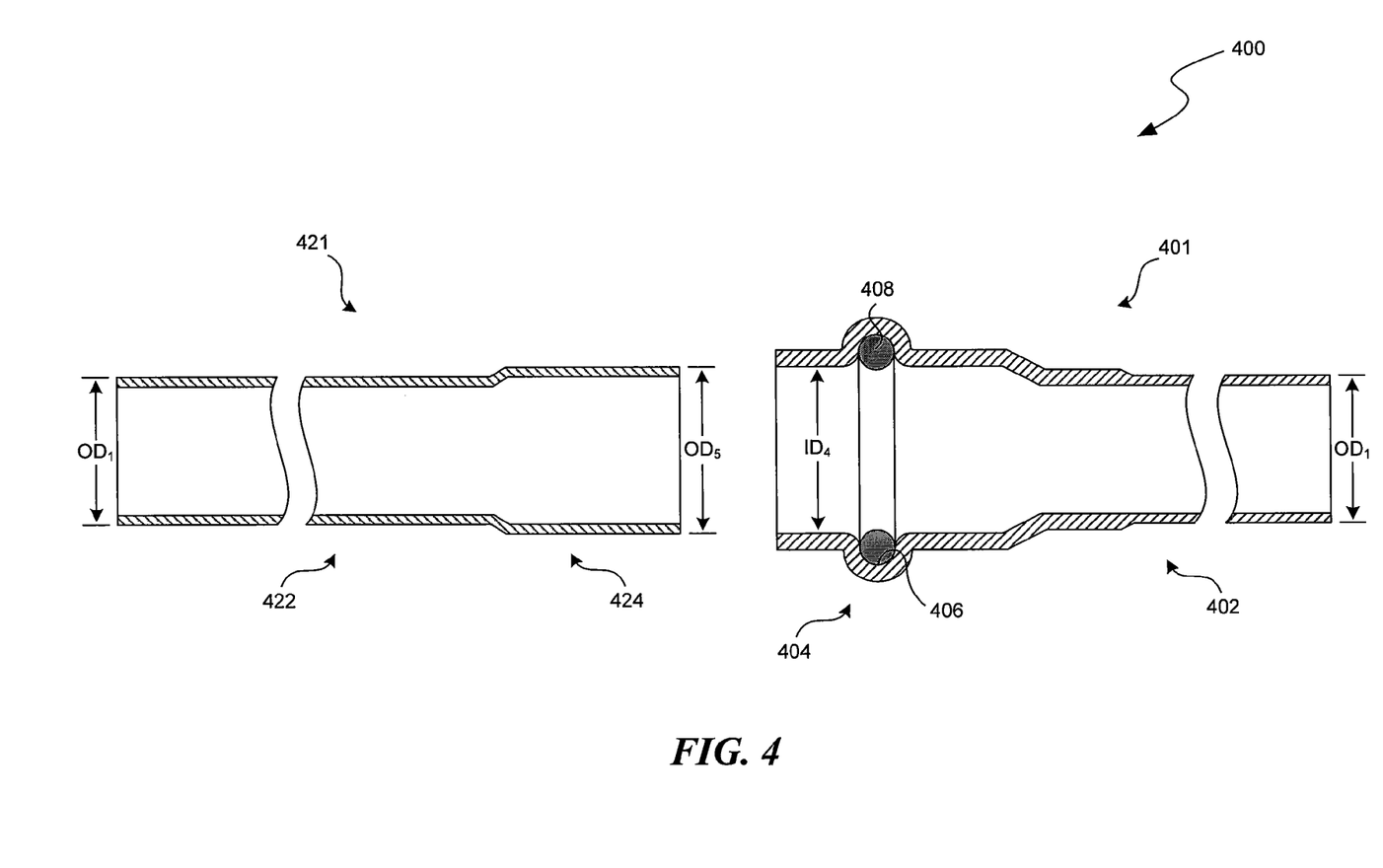
FIG. 4 is a cross-sectional side view of a fluid conduit assembly configured in accordance with an embodiment of the disclosure.

FIG. 4 is a cross-sectional side view of a fluid conduit assembly 400 configured in accordance with another embodiment of the disclosure. The fluid conduit assembly 400 includes a first fluid conduit 401 that is configured to be mechanically joined to a second fluid conduit 421. In the illustrated embodiment, the first fluid conduit 401 is at least generally similar in structure and function to the fluid conduits 101, 201, and 301 described above. For example, the first fluid conduit 401 includes an enlarged first end portion 404 adjacent to a first body portion 402. The first end portion 404 includes an increased wall thickness relative to the first body portion 402. The first end portion 404 also includes a seal 408 positioned in an annular groove 406. In this embodiment, however, the second conduit 421 includes an enlarged second end portion 424 to be inserted into the first end portion 404.

More specifically, the second fluid conduit 421 includes a second body portion 422 having the same outer diameter (i.e., the first outer diameter $OD_1$) as the first body portion 402 of the first fluid conduit 401. The second end portion 424, however, includes an enlarged fifth outer diameter $OD_5$ that is greater than the first outer diameter $OD_1$. The first end portion 404 includes an enlarged fourth inner diameter $ID_4$ that is sized to receive the enlarged second end portion 424. The diameters of the first end portion 404 and the second end portion 424 can be enlarged according to the upset forging processes described above. Once the second end portion 424 has been inserted into the first end portion 404 (not shown in FIG. 4), the first end portion 404 can be compressed or otherwise deformed to mechanically join the first fluid conduit 401 and the second fluid conduit 421.

The enlarged first end portion 404 and the enlarged second end portion 424 provide adequate mechanical interference during the compression to join the first conduit 401 to the second conduit 421 with a sufficient crimping force suitable for various applications of the conduit assembly 400. Moreover, the enlarged first and second end portions 404, 424 can provide the sufficient compression force without constricting the flow of a liquid or gas through the conduit assembly 400. For example, when the first end portion 404 is compressed around the second end portion 424, the fifth outer diameter $OD_5$ can be compressed to be generally equivalent to the size of the first outer diameter $OD_1$ without impeding or constricting the flow of a fluid through the conduit assembly 400.

Figure 5:
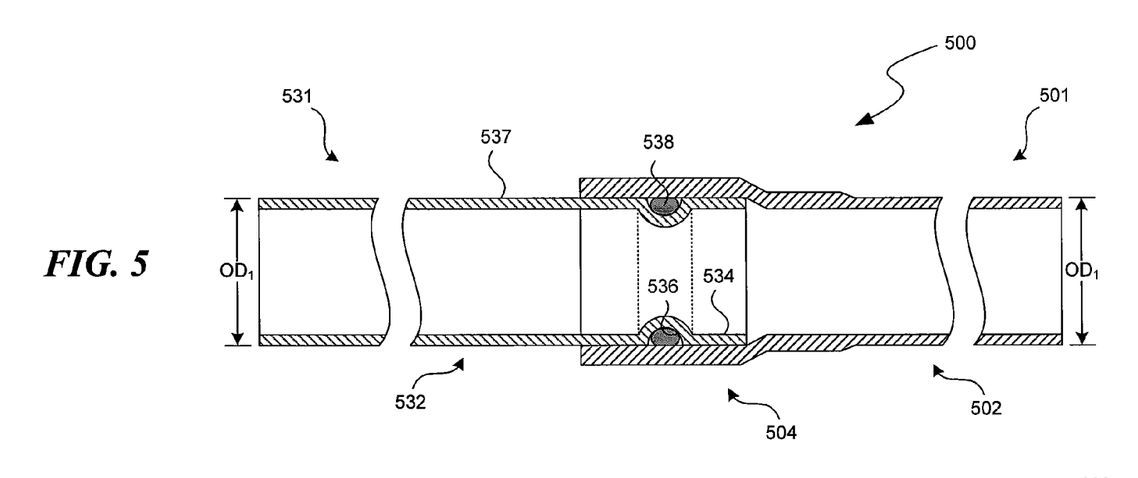
FIG. 5 is a cross-sectional side view of a fluid conduit assembly configured in accordance with another embodiment of the disclosure.

FIG. 5 is a cross-sectional side view of a fluid conduit assembly 500 configured in accordance with a further embodiment of the disclosure. The fluid conduit assembly 500 includes a first fluid conduit 501 configured to be mechanically joined to a second fluid conduit 531. The first conduit 501 is at least generally similar in structure and function to the fluid conduits 101, 201, 301, and 401 described above. For example, the first conduit 501 includes an enlarged first end portion 504 adjacent to a first body portion 502. The first end portion 504 includes an increased wall thickness relative to the first body portion 502. In the illustrated embodiment, however, first end portion 504 does not include an annular groove or seal. Rather, the second conduit 531 includes an annular groove 536 formed on an exterior surface 537 of a second end portion 534. A seal 538 is positioned in the groove 536 to contact the interior surface of the first end portion 504 when the second end portion 534 is inserted into the first end portion 504. The illustrated second fluid conduit 531 also includes a second body portion 532 adjacent to the second end portion 534. The second body portion 532 has the same outer diameter (e.g., the first outer diameter $OD_1$) as the first body portion 502. In other embodiments, however, the diameters of the first body portion 502 and the second body portion 532 can be different. To mechanically join the first and second conduits 501, 531, the first end portion 504 can be compressed or otherwise deformed around the second end portion 534. When compressed, the seal 538 at least partially deforms against the interior surface of the first end portion 504 to form a fluid tight seal therebetween.

Figure 6:
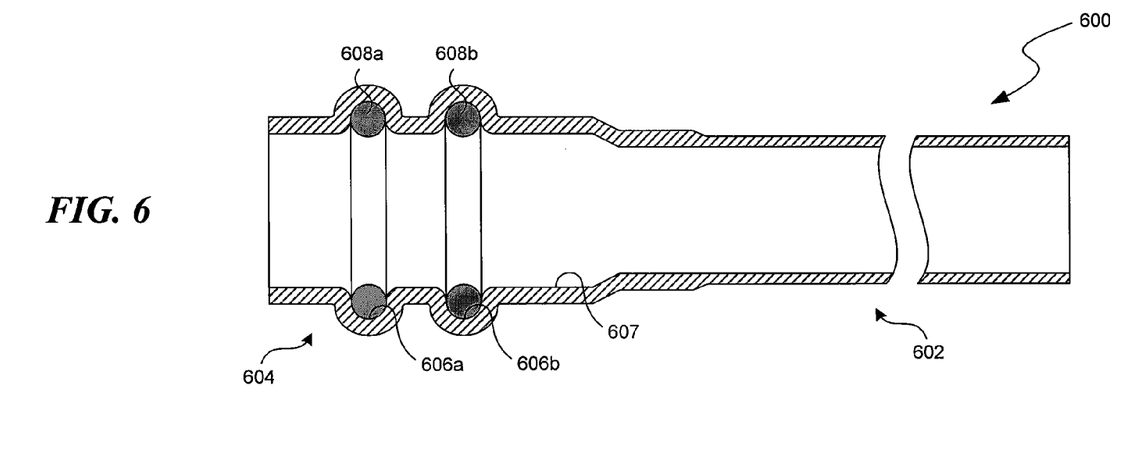
FIG. 6 is a cross-sectional side view of a fluid conduit configured in accordance with a further embodiment of the disclosure.

FIG. 6 is a cross-sectional side view of a fluid conduit 600 configured in accordance with another embodiment of the disclosure. The fluid conduit 600 includes an end portion 604 adjacent to a body portion 602. The end portion 604 includes the increased wall thickness and enlarged diameter generally similar to the embodiments described above. In this embodiment, however, the end portion has two seals 608a, 608b disposed (herein. More specifically, the end portion 604 includes a first annular groove 606a formed on an interior surface 607 of the end portion 604, and a second annular groove 606b formed on the interior surface 607 and spaced apart from the first annular groove 606a. The first seal 608a is positioned in the first annular groove 606a, and the second seal 608b is positioned in the second annular groove 606b. Accordingly, when the end portion 604 is compressed or otherwise deformed around another inserted fluid conduit (not shown in FIG. 6), each of the first and second seals 608a, 608b contacts the other conduit to form a fluid tight connection therebetween. Similar to the seals in the embodiments described above, the illustrated first and second seals 608a, 608b have generally circular cross-sections. In other embodiments, however, they can have other shapes and configurations suitable for forming the connection. Moreover, the first seal 608a can be formed from a different material and/or have a different shape than the second seal 608b.

Figure 7A:
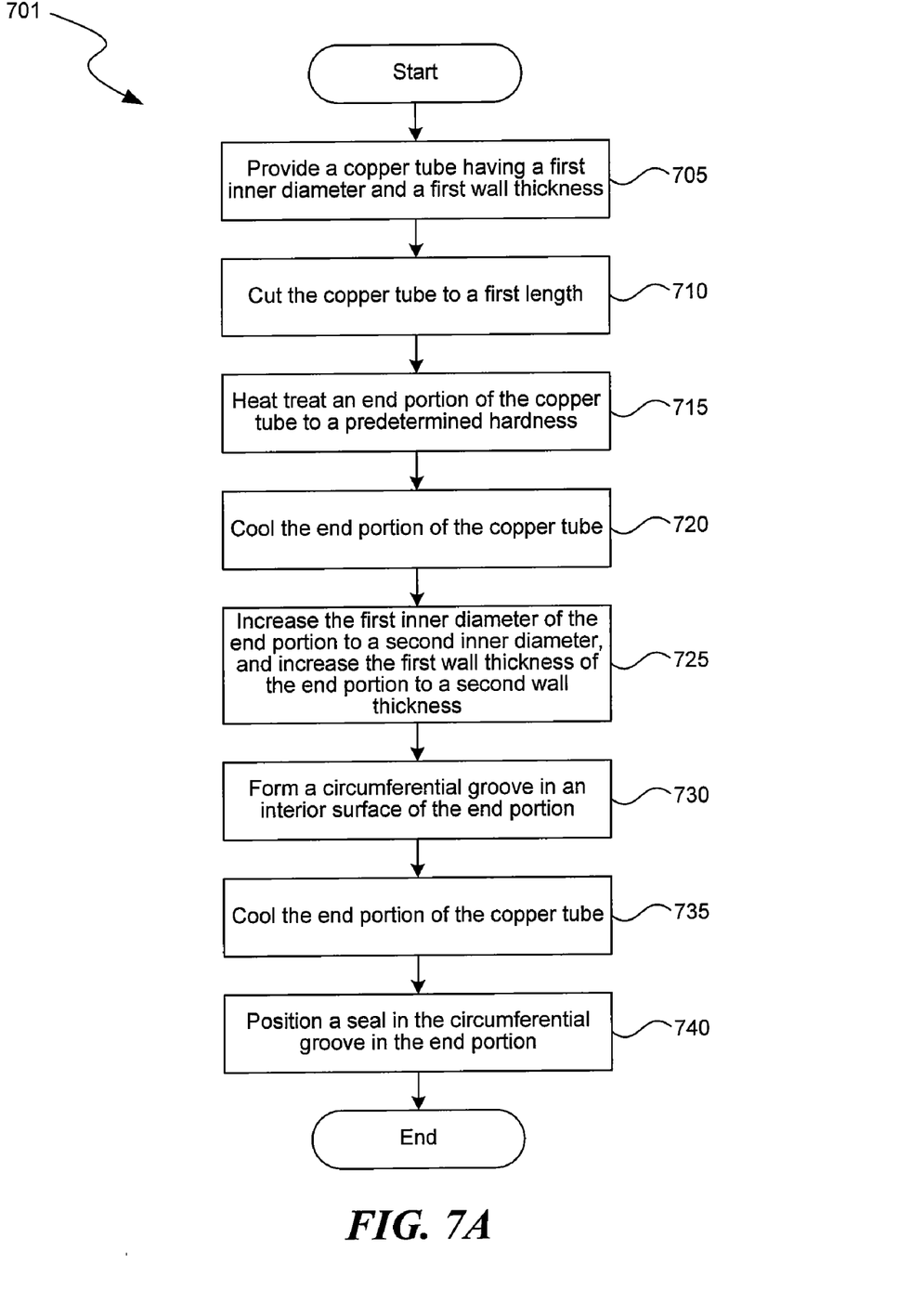
FIGS. 7A and 7B are flow diagrams of processes for forming a fluid conduit in accordance with further embodiments of the disclosure.

FIG. 7A is a flow diagram of a process 701 for forming a fluid conduit in accordance with an embodiment of the disclosure. In the illustrated embodiment, the process 701 includes providing a tube (e.g., a copper tube) having a first inner diameter and a first wall thickness (block 705). By way of example, in certain embodiments the copper tube can include dimensions generally conforming to ASME standards as described above. The process 701 can further include cutting or otherwise forming the copper tube to a first length (block 710). In certain embodiments, the first length can include a finished length of the copper tube plus an additional incremental length to account for any shortening of the copper tube that may result from the subsequent processing steps described below. For example, in one embodiment, the copper tube can be cut to a first length that is slightly greater than about 20 feet such that the finished length of the copper tube is about 20 feet after completing all of the processing steps. In other embodiments, however, the first length can be greater than or less than about 20 feet depending on various factors such as desired finished length, changes in length that occurs during processing, etc.

The process 701 also includes heat treating an end portion of the copper tube to a predetermined hardness (block 715). In one embodiment, the heat treatment can include annealing (e.g., induction annealing) the end portion with the application of heat to reduce the hardness of the end portion to facilitate forming. For example, in one embodiment the heat treatment can include annealing the end portion to a hardness of approximately 30-50 in a Rockwell Hardness 15T scale. In other embodiments, however, the heat treatment can include annealing the end portion to a hardness of approximately 30-40 in a Rockwell Hardness 15T scale, or 35-40 in a Rockwell Hardness 15T scale. In still further embodiments, the end portion can be heat treated to other hardnesses, such as hardnesses that are greater than or less than approximately 30-50 in a Rockwell Hardness 15T scale, or other suitable scale used for measuring hardness.

In one aspect of these embodiments, the hardness along the heat treated end portion may vary due to the method of heat treating. For example, induction annealing the end portion with a heating coil can cause the hardness of the end portion to slightly increase near the end of the heating coil. In one embodiment, for example, a copper tube having a nominal diameter of about 1.125 inches can have a heat treated end portion with a length of about 3.5 inches. The majority of the end portion (e.g., up to about 3.0 inches) may have a hardness of about 32-36 in a Rockwell Hardness 15T scale. Near the end of the heating coil however, the end portion of the tube (e.g., from about 3.0 to 3.5 inches) may have a hardness that increases from about 36-50 in a Rockwell Hardness 15T scale. In other embodiments, however, the hardness of the end portion can be generally constant or vary by different values than those described above. According to another aspect of these embodiments, the hardness of the tube increases in a transition zone extending from the heat treated end portion to the non-heat treated portion of the tube. In one embodiment, for example, the transition zone can have a length of about 0.125 to 0.25 inch, and the hardness of the tube can increase in the transition zone from the heat treated hardness (e.g., about 30-50 in a Rockwell Hardness 15T scale) to the full hardness (e.g., about 80 in a Rockwell Hardness 15T scale) of the non-heat treated tube. In other embodiments, however, the length of the transition zone can be greater or less than about 0.125 to 0.25 inch. In yet other embodiments, heat treatment of the end portion can be omitted.

After heat treating the end portion, the process 701 further includes cooling the end portion of the copper tube (block 720). In one embodiment, for example, the end portion can be rapidly cooled by quenching the end portion in water, oil, air, and/or any other suitable quenching medium. In other embodiments, however, the end portion can be cooled at a slower rate following the annealing process.

The process 701 continues by increasing the first inner diameter of the end portion to a second inner diameter, and increasing the first wall thickness to a second wall thickness (block 725). In one embodiment, increasing the inner diameter and wall thickness of the end portion can be accomplished as described above with reference to FIGS. 1A-6. For example, one or more dies can be used to increase the inner diameter and wall thickness in a forging process, e.g., an upset forging process. In other embodiments, other suitable manufacturing processes can be used for increasing the inner diameter and wall thickness dimensions of the end portion. The process 701 further includes forming (e.g., rolling) an annular or circumferential groove in an interior surface of the end portion (block 730). After forming the circumferential groove in the end portion, the process 701 can include cooling the end portion (block 735) and positioning a seal (e.g., an o-ring) in the circumferential groove (block 740).

Figure 7B:
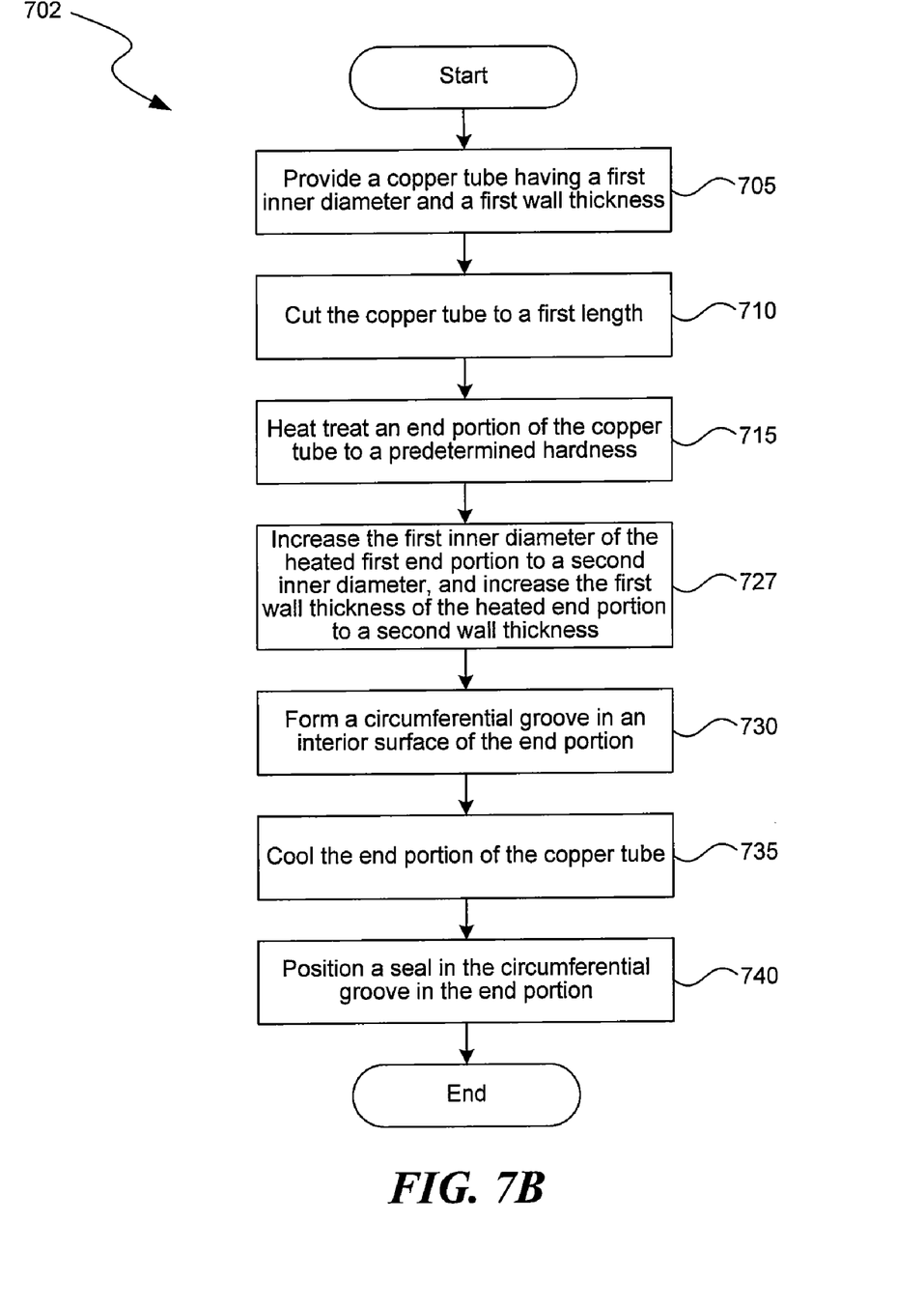

FIG. 7B is a flow diagram of a process 702 for forming a fluid conduit in accordance with another embodiment of the disclosure. In the illustrated embodiment, several steps of the process 702 are generally similar to corresponding steps of the process 701 described above with reference to FIG. 7A. For example, the process 702 can include providing a tube (e.g., a copper tube) (block 705), cutting the copper tube to a first length (block 710), and heat treating an end portion of the copper tube (block 715). In one embodiment, heat treating an end portion of the copper tube can include annealing (e.g., induction annealing) the end portion to reduce the hardness. In one aspect of this embodiment, however, the process 702 does not include cooling the end portion following the heat treatment. Rather, the process 702 includes increasing the first inner diameter of the heated first end portion to a second inner diameter, and increasing the first wall thickness of the heated end portion to a second wall thickness (block 727). By way of example, in certain embodiments increasing these dimensions of the heated end portion can be accomplished by hot forging the end portion. In other embodiments, however, the process 702 can include other suitable manufacturing processes for increasing these dimensions of the heated end portion. Following these steps, the process 702 can further include forming a groove in the end portion (block 730), cooling the end portion (block 735), and positioning a seal in the groove (block 740) in a manner generally similar to that described above with reference to the process 701 shown in FIG. 7A.

Although the processes 701 and 702 described above can be used to form integral end fittings on copper or copper alloy tubing, the present disclosure is not limited to these materials. In other embodiments, it is contemplated that these processes or variations thereof can be used with other suitable conduit materials including, for example, other suitable metals and metal alloys that may include iron, bronze, etc.

From the foregoing, it will be appreciated that specific embodiments of the disclosure have been described herein for purposes of illustration, but that various modifications may be made without deviating from the spirit and scope of the various embodiments of the disclosure. For example, fluid conduit assemblies can include adhesives and/or other components to facilitate joining the conduits. Further, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

We claim:

1. A method of forming a fluid conduit, the method comprising:
   providing a copper tube having a first inner diameter and a first wall thickness;
   heat treating an end portion of the copper tube;
   increasing the wall thickness of the end portion from the first wall thickness to a second wall thickness;
   increasing the inner diameter of the end portion from the first inner diameter to a second inner diameter; and
   forming a circular groove in an interior surface of the end portion, wherein the end portion is configured to be crimped around a separate copper fluid conduit to join the end portion to the separate copper fluid conduit.

2. The method of claim 1 wherein heat treating the end portion of the copper tube includes reducing the hardness of the end portion from a first hardness to a second predetermined hardness that is less than the first hardness.

3. The method of claim 1 wherein heat treating the end portion of the copper tube includes annealing the end portion to reduce the hardness.

4. The method of claim 1 wherein heat treating the end portion includes annealing the end portion to a hardness in the range of approximately 30-40 in a Rockwell Hardness 15T scale.

5. The method of claim 1, further comprising cooling the end portion after heat treating the end portion and before increasing the wall thickness and the inner diameter of the end portion.

6. The method of claim 5 wherein cooling the end portion includes quenching the end portion.

7. The method of claim 1 wherein at least one of increasing the wall thickness of the end portion and increasing the inner diameter of the end portion includes upset forging the end portion of the copper tube.

8. The method of claim 1 wherein at least one of increasing the wall thickness of the end portion and increasing the inner diameter of the end portion includes hot forging the end portion of the copper tube.

9. The method of claim 1, further comprising positioning a seal in the circular groove in the end portion of the copper tube.

10. The method of claim 1 wherein:
increasing the wall thickness of the end portion includes increasing the wall thickness of a first length of the end portion; and
increasing the inner diameter of the end portion comprises increasing the inner diameter of a second length of the end portion, wherein the second length is less than the first length.

11. A method of manufacturing a plumbing conduit, the method comprising:
providing a copper tube having a generally uniform cross-section with an outer diameter and a first wall thickness;
annealing an end portion of the copper tube;
upset forging the end portion to provide an inner diameter of the end portion that is equal to or greater than the outer diameter of the copper tube, wherein upset forging the end portion of the copper tube includes increasing the wall thickness of the end portion from the first wall thickness to a second wall thickness;
forming a circumferential groove in an interior surface of the end portion; and
disposing a resilient seal in the circumferential groove, wherein the end portion is configured to be permanently deformed around a portion of another copper tube to form a sealed connection therebetween.

12. The method of claim 11, further comprising quenching the end portion of the copper tube after annealing the end portion.

13. The method of claim 11 wherein upset forging the end portion of the copper tube includes positioning the end portion in a first die and inserting a second die into the end portion.

14. The method of claim 11 wherein annealing the end portion of the copper tube includes induction annealing the end portion.

15. The method of claim 11 wherein annealing the end portion of the copper tube includes annealing the end portion to have a hardness of approximately 30-40 in the Rockwell Hardness 15T scale.

16. The method of claim 11 wherein upset forging the end portion includes:
upset forging the end portion to provide the inner diameter along a first length of the end portion; and
increasing the wall thickness of the end portion along a second length of the end portion, wherein the second length is greater than the first length.

17. A method of manufacturing a plumbing conduit, the method comprising:
providing a copper tube having a generally uniform cross-section with an outer diameter and a first wall thickness;
heat treating an end portion of the copper tube to a predetermined hardness;
while the end portion of the copper tube is at an elevated temperature from the heat treating, upsetting the heated end portion to provide the end portion with a second wall thickness that is greater than the first wall thickness, wherein upsetting the heated end portion of the copper tube includes increasing an inner diameter of the end portion to be equal to or greater than the outer diameter of the copper tube
forming a circular groove in an interior surface of the end portion; and
positioning a seal in the circular groove, wherein the end portion is configured to be plastically deformed to join the end portion to a separate copper tube that is inserted into the end portion.

18. The method of claim 17 wherein upsetting the heated end portion of the copper tube includes hot forging the end portion.

19. The method of claim 17 wherein heat treating the end portion of the copper tube to a predetermined hardness includes annealing the end portion to have a hardness of approximately 30-40 in the Rockwell Hardness 15T scale.

20. The method of claim 17 wherein upsetting the heated end portion includes:
upsetting the heated end portion to provide the end portion with a second wall thickness along a first length of the end portion; and
increasing the inner diameter of the end portion along a second length of the end portion, wherein the second length is greater than the first length.

* * * * *

UNITED STATES PATENT AND TRADEMARK OFFICE
CERTIFICATE OF CORRECTION

| | | |
|---|---|---|
| PATENT NO. | : 7,987,690 B2 | Page 1 of 1 |
| APPLICATION NO. | : 12/137442 | |
| DATED | : August 2, 2011 | |
| INVENTOR(S) | : Michael Duggan et al. | |

It is certified that error appears in the above-identified patent and that said Letters Patent is hereby corrected as shown below:

In column 10, line 5, delete "(herein." and insert -- therein. --, therefor.

Signed and Sealed this
Fourteenth Day of February, 2012

David J. Kappos
*Director of the United States Patent and Trademark Office*